Figure 1:
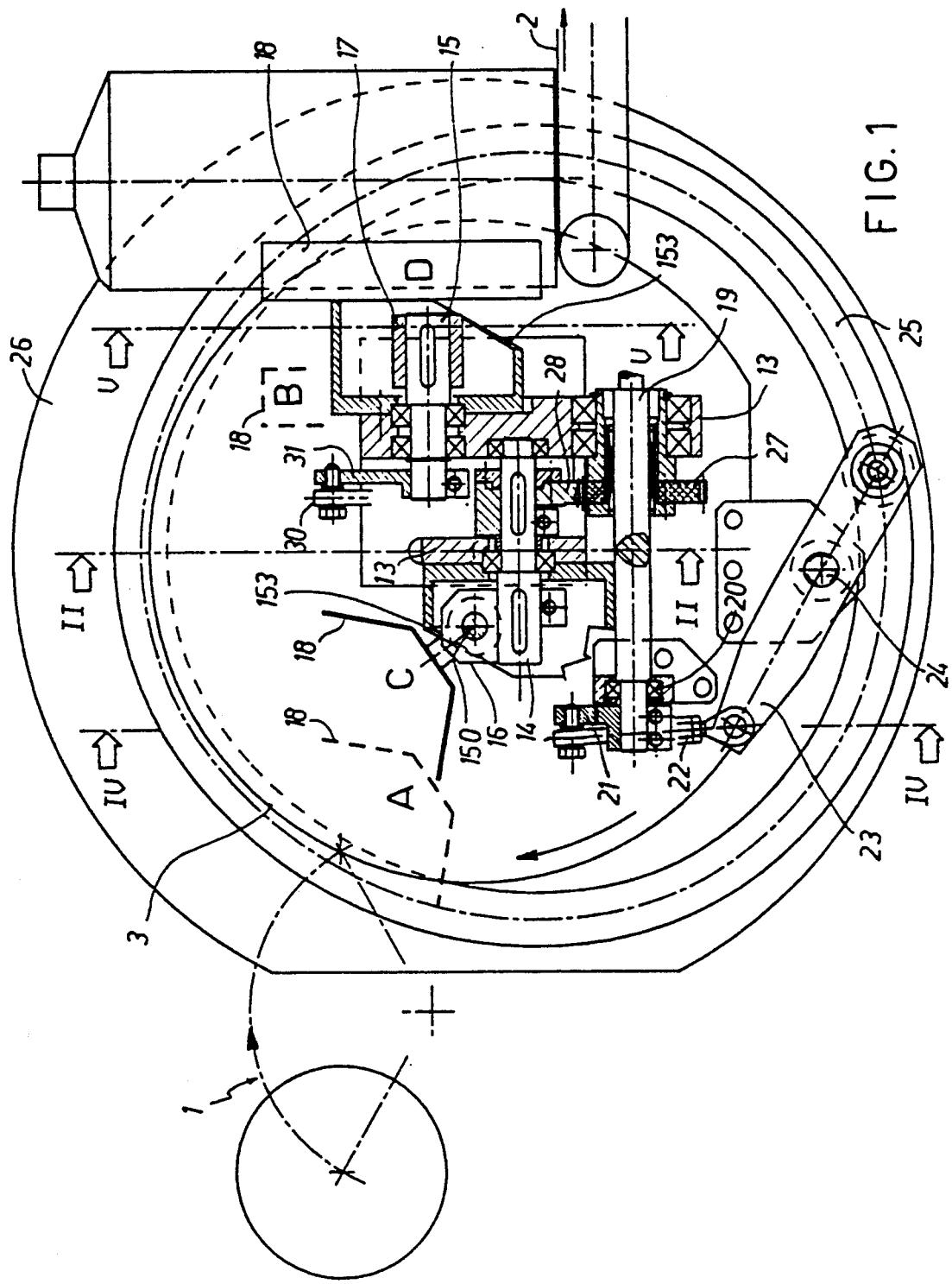

United States Patent [19]

Lusetti

[11] Patent Number: 5,291,984
[45] Date of Patent: Mar. 8, 1994

[54] DEVICE FOR UPRIGHTING CONTAINERS FROM A POSITION WITH THEIR AXIS HORIZONTAL TO A POSITION WITH THEIR AXIS VERTICAL

[75] Inventor: Wilder Lusetti, Bagnolo in Piano, Italy

[73] Assignee: O.M.S.O. S.p.A., Reggio Emilia, Italy

[21] Appl. No.: 36,643

[22] Filed: Mar. 18, 1993

[30] Foreign Application Priority Data

Apr. 2, 1992 [IT] Italy ............... RE92A00024

[51] Int. Cl.⁵ ............................................. B65G 15/00
[52] U.S. Cl. ................................. 198/408; 198/412; 198/474.1; 414/776; 414/779
[58] Field of Search ............... 414/776, 778, 779, 782, 414/783, 728, 736, 737, 738, 742, 752; 198/408, 412, 470.1, 474.1, 476.1

[56] References Cited

U.S. PATENT DOCUMENTS 1,654,091 12/1927 Peiler ........................ 198/470.1
4,064,016 12/1977 Vortmann .................. 198/412
5,031,749 7/1991 McCoy ...................... 198/470.1 X

FOREIGN PATENT DOCUMENTS 2208636 4/1989 United Kingdom ........... 198/476.1

Primary Examiner—Cheryl L. Gastineau
Attorney, Agent, or Firm—Vaden, Eickenroht, Thompson, Boulware & Feather

[57] ABSTRACT

A device for uprighting containers from a position with their axis horizontal to a position with their axis vertical comprises a circular plate (3) fixed to the end of a shaft (5) of horizontal axis by a support structure (4) arranged to undergo stepwise rotations of 180° in synchronism with a container feed line (1); two parallel shafts (14, 15) symmetrically arranged about a diameter of the plate (3) and each carrying, at that end facing away from the plate, a receptacle (18) for seizing the containers, said shafts being connected mechanically such as to undergo equal rotations in the same direction, and carrying the receptacles (18) thereon with their axes mutually perpendicular; and a fixed positive-acting cam (25) within which there engages the end of a rocker arm (23) pivoted on the plate (3), its opposite end rotating one of the shafts (14 or 15) by a mechanism comprising a connecting rod-crank unit (21, 22).

7 Claims, 8 Drawing Sheets

DEVICE FOR UPRIGHTING CONTAINERS FROM A POSITION WITH THEIR AXIS HORIZONTAL TO A POSITION WITH THEIR AXIS VERTICAL

This invention relates to a container uprighting device for positioning along a container processing (for example printing) line in order to change their orientation from a position with their axis horizontal to a position with their axis vertical.

It relates particularly but not exclusively to cylindrical containers of circular, elliptical or polygonal cross-section.

Processing lines for such containers, for example printing lines, are known to comprise means for advancing said containers stepwise with their axis horizontal along a path in which the processing stations, such as printing stations, are located.

As the printing stations have to operate on the container lateral surface, the stepwise advancement means convey the containers with their axis horizontal.

Downstream of the processing line operations take place, such as filling, which can only be effected with the container in a position with its axis vertical.

This is the reason for uprighting the container. In the known art this is generally achieved by passing the container between twisted guides which receive it with its axis horizontal and rotate it during its travel.

The known devices suffer from deficiencies which make them unsuitable for modern production processes.

Firstly the known devices suffer from operating difficulties and frequent jamming if using containers not in the form of a cylinder with a right circular cross-section, such as oval or prismatic containers.

In addition, processing lines are currently able to produce up to 6000 pieces per hour whereas the known uprighting devices have a production rate of only just over 4000 pieces per hour.

Lastly the known operating system results in machines of considerable length, which are difficult to install in modern processing lines.

The object of the invention is to overcome these and further known drawbacks by a device which is of very small overall dimensions while at the same time providing a production rate at least equal to that of current processing lines.

This object is attained by a device using pneumatic seizure means positioned on a rotating circular plate of horizontal axis which operates stepwise synchronously with an upstream processing line, and on which means are positioned to cause said seizure means to undergo, at each step, a rotation of 90° about an axis perpendicular both to the container axis and to the plate axis.

In an improved version, means are also provided to cause the seizure means to undergo translational movement along a diameter of the plate at each step.

Finally means can be provided to cause the seizure means to undergo a further rotation smaller than 90° about an axis parallel to the container axis.

Figure 1A:
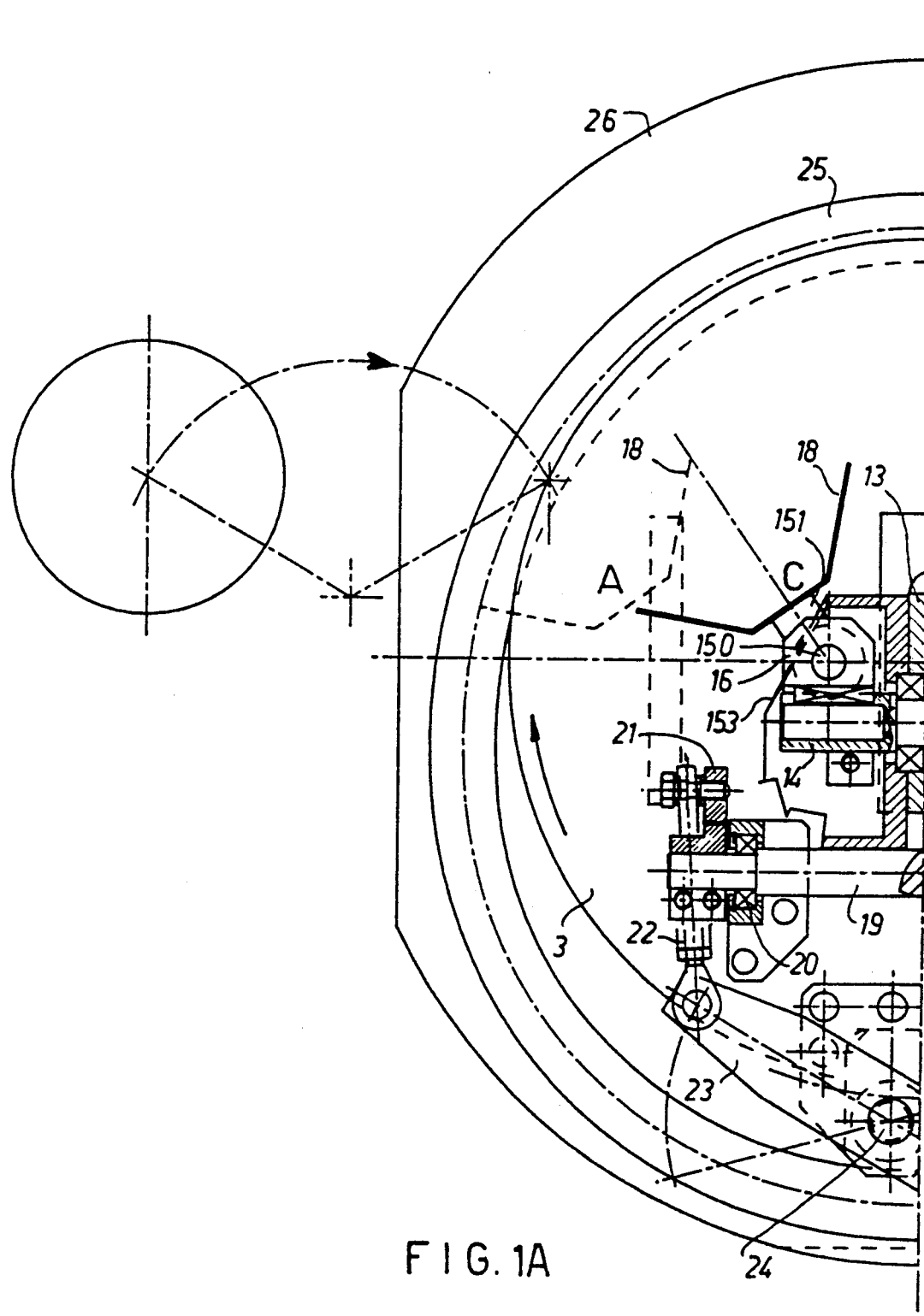
Figure 1B:
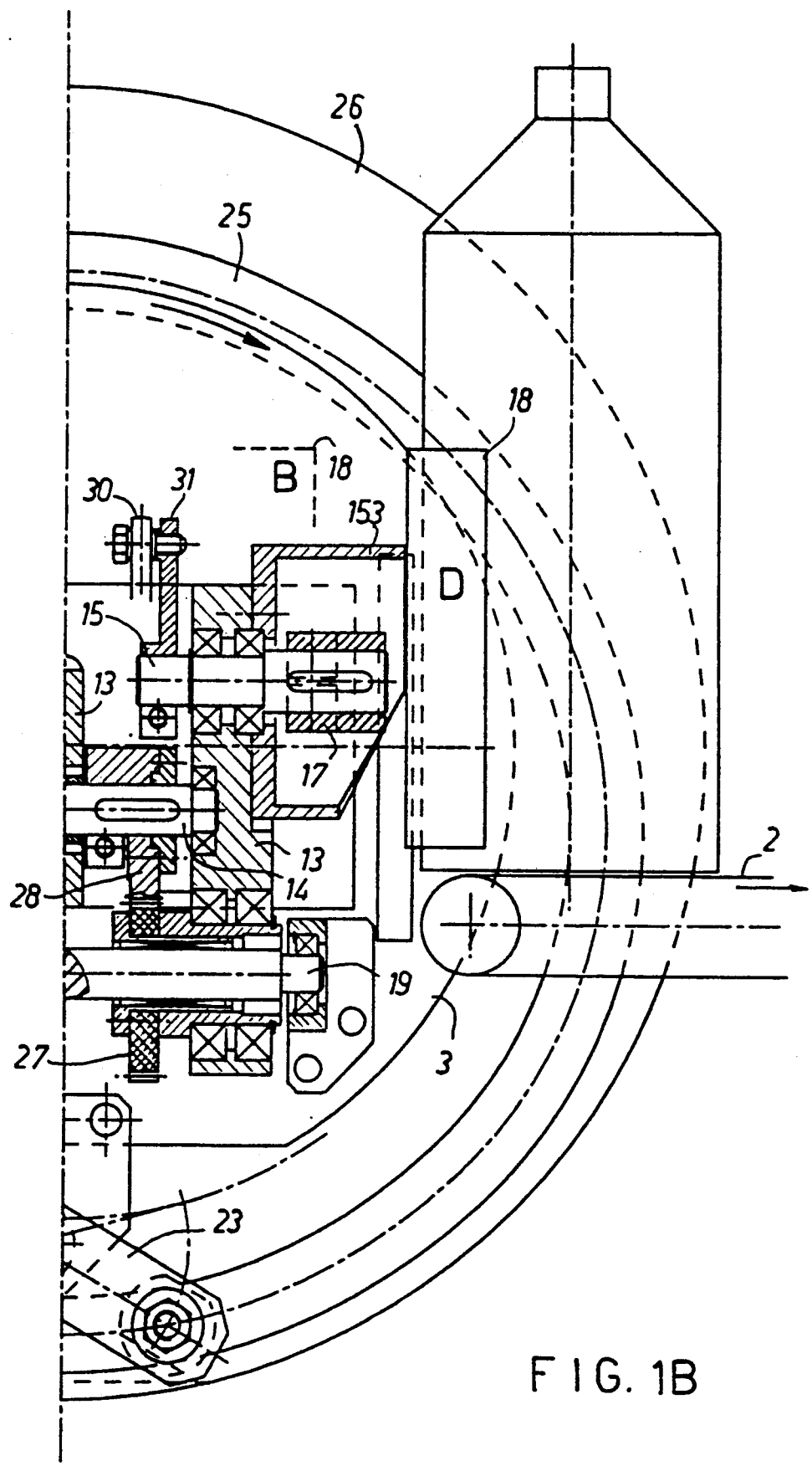
Figure 2:
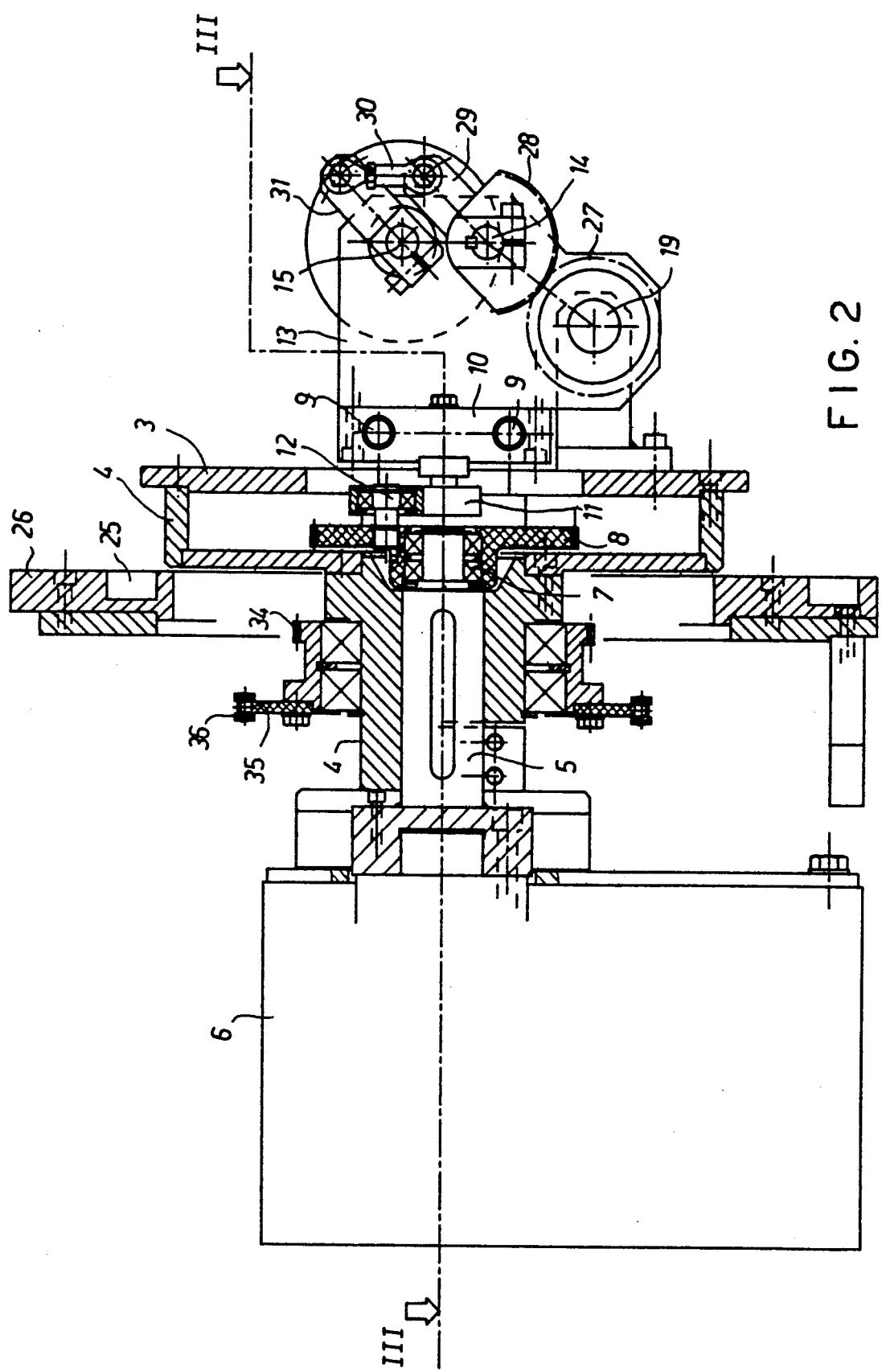
Figure 3:
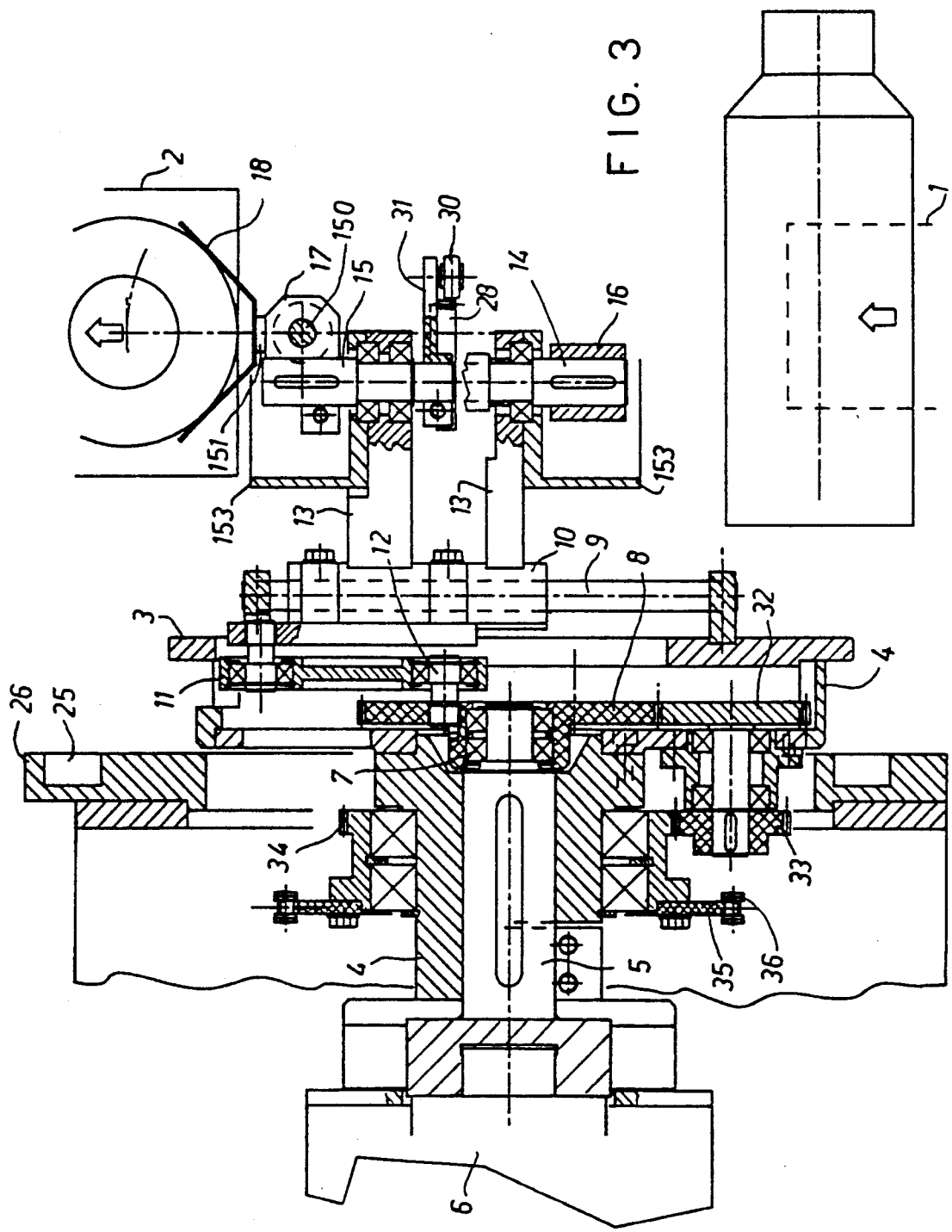
Figure 4:
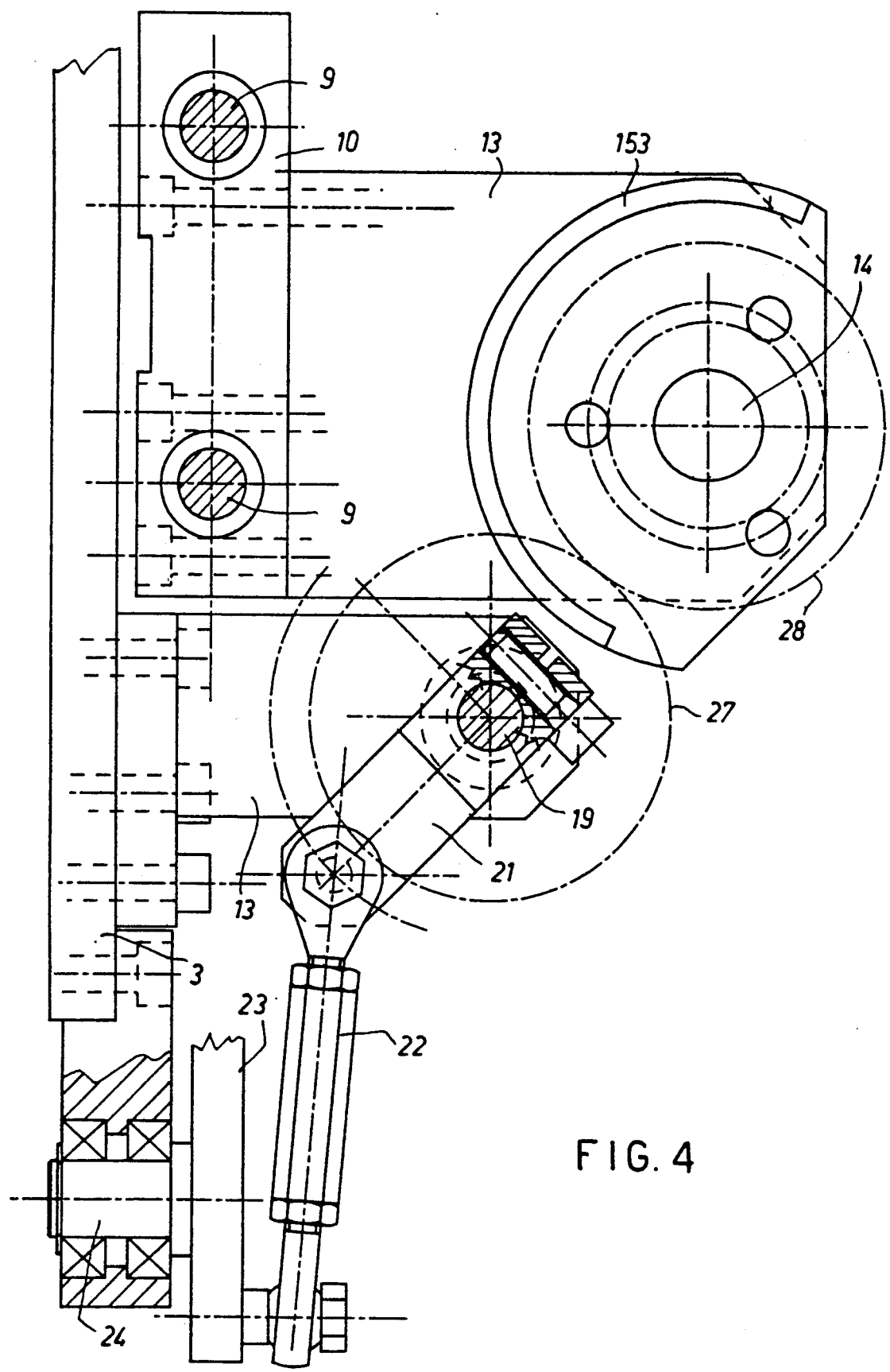
Figure 5:
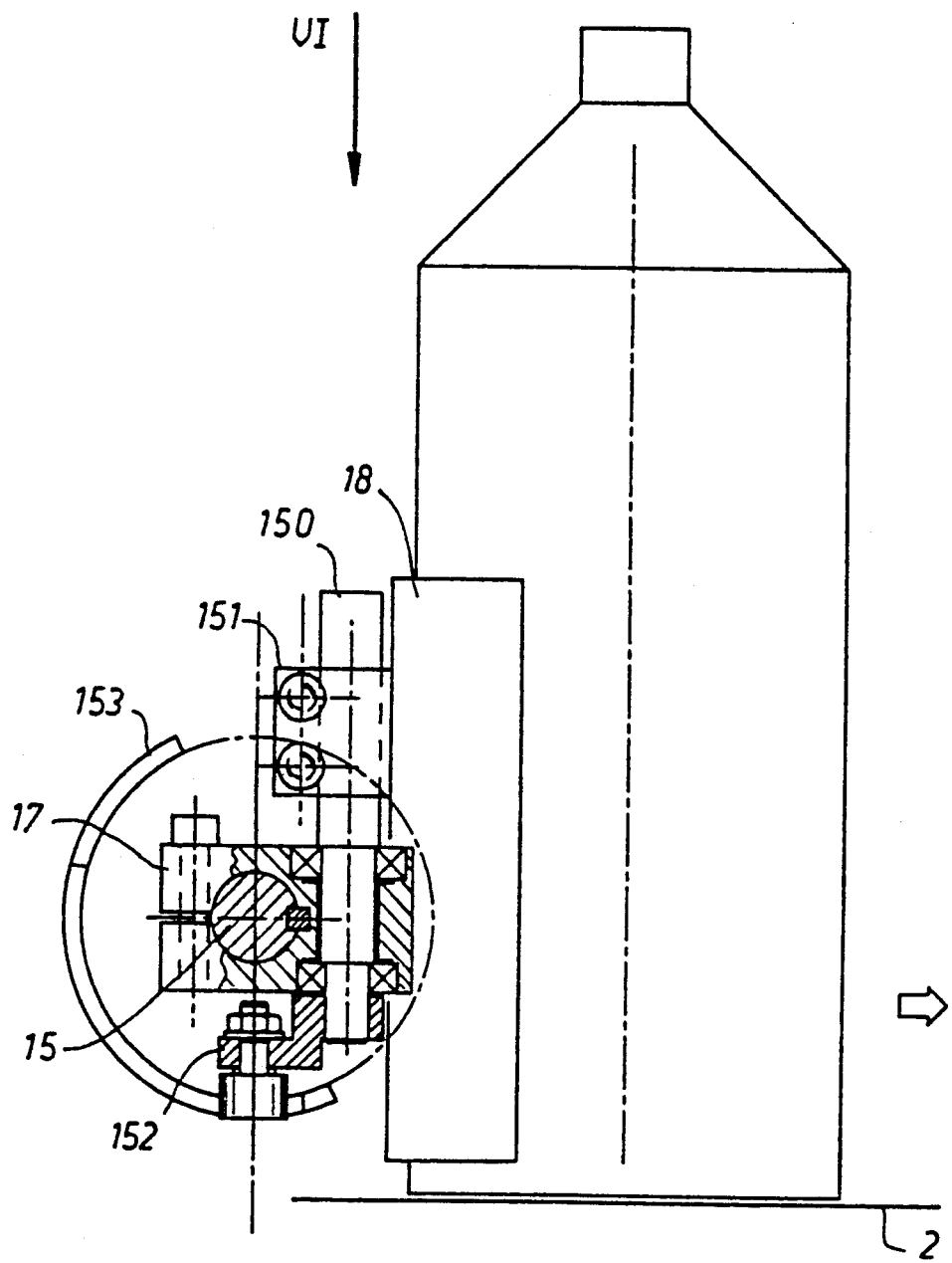
Figure 6:
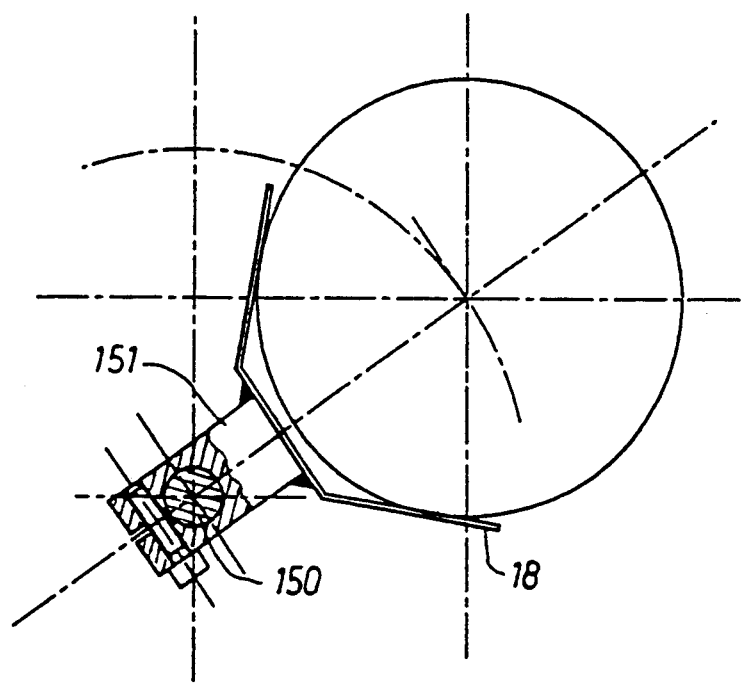

The merits and the operational and constructional characteristics of the invention will be more apparent from the detailed description of a preferred embodiment thereof given hereinafter by way of non-limiting example and illustrated in the figures of the accompanying drawings, in which:

FIG. 1 is a front view of the invention;
FIGS. 1A and 1B represent two halves of FIG. 1 to an enlarged scale;
FIG. 2 is a section on the line II—II of FIG. 1;
FIG. 3 is a section on the line III—III of FIG. 2;
FIG. 4 is a section on the line IV—IV of FIG. 1, with the shaft 19 rotated through 90° from the position shown in FIG. 1;
FIG. 5 is a section on the line V—V of FIG. 1;
FIG. 6 is a view in the direction of the line VI of FIG. 5.

FIG. 1 shows the container flow line, comprising an arrival line which feeds the containers with their axis horizontal and consists for example of a stepping feeder 1, and a departure line which receives the containers with their axis vertical, and consists for example of a conveyor 2 driven with continuous motion.

The device according to the present patent is located to the side of the flow line between the feeder 1 and the conveyor 2.

It comprises (FIG. 3) a substantially circular plate 3 supported by the rear structure 4, which is fixedly keyed onto the shaft 5.

The shaft 5 is the exit shaft of a programmer 6 which controls the 180° step rotations of the shaft 5 synchronously with the speed of the stepwise feeder 1.

A sun wheel 8 is idly mounted on the end of the shaft 5 via bearings 7.

The plate 3 carries on its front (to the right in FIG. 2) two parallel guides 9 symmetrical about the plate centre and on which a slide 10 slides.

The slide 10 is connected by the connecting rod 11 to the pin 12 located eccentrically on the sun wheel 8.

For each turn of the gear wheel 8, the slide therefore undergoes a to-and-fro movement on the guides 9 to lie alternately at one end and the other of the guides.

As can be best seen in FIG. 3, by means of the brackets 13 the slide 10 supports two shafts 14 and 15 parallel to the plate 3, each of which, at that end projecting outwards from the plate 3, carries a support piece 16, 17 respectively, which by means of a pin perpendicular to the shaft 14 or 15 supports a dihedral receptacle 18 which retains the container by vacuum.

The engagement between the shafts 14, 15 and the respective receptacles 18 is identical and is best seen in FIG. 5, in the case of the shaft 15 alone.

The support piece 17 is locked onto the shaft 15 and by way of bearings supports on idle pin 150 perpendicular to the shaft 15.

A support piece 151 rigid with the receptacle 18 is fixed to one end of the pin 150.

To the other end of the pin 150 there is fixed a crank 152, the end of which is guided within a positive-acting cam 153 extending along a cylindrical surface and rigid with the plate 3.

By virtue of the aforesaid construction, when the plate 3 undergoes a rotation of 180°, the receptacle 18 rotates about the shaft 150, as can be seen in FIG. 6.

The engagement of the receptacle rigid with the shaft 14 is achieved in the same manner.

This rotation, which in the illustrated example is of 55°, enables the receptacle to lie in the loading station (to the left in FIG. 1) with its plane of symmetry inclined upwards to receive the container, and in the discharge station (to the right in FIG. 1) with its plane of symmetry coinciding with the axis of the conveyor 2 in order not to hinder the discharge of the container.

When the shafts 14 and 15 are horizontal, the two dihedral devices are oriented with their axes perpendicular to each other.

When the plate 3 undergoes one half of a revolution (180°), the shafts 14 and 15 rotate through one quarter of a revolution (90°) with the result that when the container is transported from the feeder 1 to the conveyor 2, the container simultaneously rotates through 90° to rest upright on the conveyor 2.

The 90° rotations of the shafts 14 and 15 occur at each half revolution of the plate 3, by virtue of the following linkage.

In a position parallel to the shafts 14 and 15 the plate 3 supports a prismatic shaft 19, which can rotate on the bearing 20 (FIG. 1).

For each half revolution of the plate 3, the prismatic shaft 19 undergoes a 90° rotation, first in one direction and then in the other direction, it being connected by a crank 21 and a connecting rod 22 to one end of the rocker lever 23. This latter rocks on a pin 24 rigid with the plate 3 by virtue of the engagement of its opposite end in the positive-acting cam 25 provided in a circular ring 26 rigid with the machine base.

A gear 27 mounted idly on one of the brackets 13 can slide axially on the prismatic shaft but is torsionally locked thereon, to follow the to-and-fro movement of the slide 10 in addition to rotating with the shaft 19.

The rotations of the gear 27 are transmitted to the shaft 14 via a toothed sector 28 (FIG. 2).

The toothed sector 28 also transmits its rotations to the shaft 15 via the crank 29, connecting rod 30 and crank 31.

Hence for each half revolution of the plate 3 the shafts 14 and 15 rock through 90° in one direction or the other.

As stated, for each half revolution of the plate 3 the slide 10 moves from one end of the guides 9 to the other, driven by the connecting rod 11 connected to the gear wheel 8.

The gear wheel 8 is the sun exit wheel of an epicyclic gear set, of which the planet wheels are the gear wheels 32 and 33, and the sun entry wheel is the gear wheel 34 (FIG. 3).

This latter is mounted idly on the structure 4 via bearings, and is driven via a sprocket 35 from the chain 36, which is connected to the general machine drive.

The operation of the invention is as follows.

The containers arrive at regular time intervals in position A (shown dashed in FIG. 1), when the plate 3 is at rest between one 180° movement and the next, and the slide 10 is completely to the left in FIG. 1.

In this position the containers, which have their axis horizontal, are deposited into the left receptacle 18, which retains them as it is put under vacuum by usual means, not shown.

The right receptacle 18 is at that moment in position B (shown by dashed lines).

At that same moment the plate 3 begins its 180° movement in the clockwise direction in FIG. 1, during which the left receptacle 18 moves from position A to position D (on the right), whereas the right receptacle moves from position B to position C (in FIG. 1).

During the next halt, because of the shift undergone by the slide 10, the left receptacle passes from position C to position A, and the right receptacle passes from position D to position B; the cycle is then repeated.

The transmission ratios are calculated such that during the rotation of the plate 3 the slide 10 is practically at rest relative to it.

During rotation of the plate 3, the lever 23, the end of which follows the cam 25, rocks so that by means of the connecting rod 22 and crank 21 it rotates the prismatic shaft 19, with which the gear 27, the toothed sector 28 and the shafts 14 and 15 rotate.

By virtue of this rotation, which is of 90° because of the transmission ratios used, the axes of the receptacles 18 and hence of the containers also rotate through 90°.

Consequently the axis of that receptacle (and hence of the container) which was horizontal in position A on the left becomes vertical when in position D on the right, and vice versa for that receptacle which moves from position D on the right to position A on the left.

On termination of the movement the container is deposited upright on the conveyor 2 by interrupting the vacuum in the receptacle which supports it.

During the halt stage of the plate 3 between one 180° movement and the next, the sun wheel 8 undergoes a 180° rotation during which the connecting rod 11 drags the slide 10 into the loading position on the left in FIG. 1.

From the aforegoing description it will be noted that in moving from the loading position to the discharge position the receptacle 18 not only undergoes 90° rotations about the axes of the shafts 14 and 15 but also undergoes rotations about an axis parallel to its own longitudinal axis and hence perpendicular to the axis of the shafts 14 and 15, all as illustrated in FIG. 1, by the action of the means shown in FIGS. 5 and 6.

The purpose of these latter rotations is to orientate the receptacle in a manner to facilitate the loading of the container because in FIG. 1 the receptacle reaches the feeder 1 along a trajectory having a vertical component.

If the container were to arrive along a perfectly horizontal trajectory this further rotation would not be necessary.

Finally it should be noted that the device can be operated in the opposite direction to act as a reclining device instead of an uprighting device.

I claim:

1. A device for uprighting containers from a position with their axis horizontal to a position with their axis vertical, characterised by comprising:
   a circular plate (3) fixed to the end of a shaft (5) of horizontal axis by means of a support structure (4) arranged to undergo stepwise rotations of 180° in synchronism with a container feed line (1);
   two parallel shafts (14, 15) symmetrically arranged about a diameter of the plate (3) and each carrying, at that end facing away from the plate, a receptacle (18) for seizing the containers, said shafts being connected mechanically such as to undergo equal rotations in the same direction, and carrying the receptacles (18) thereon with their axes mutually perpendicular;
   a fixed positive-acting cam (25) within which there engages the end of a rocker arm (23) pivoted on the plate (3), its opposite end rotating one of the shafts (14 or 15) by means of a mechanism comprising a connecting rod-crank unit (21, 22).

2. A device as claimed in claim 1, characterized in that the two shafts (14, 15) together with their mutual mechanical connections, are located on a slide (10) which moves translationally on two guides (9) fixed to the plate (3) and parallel to the shafts (14) and (15).

3. A device as claimed in claim 2, characterized in that on the shaft (5) of the plate (3) there is idly mounted a gear wheel (8), representing the exit sun wheel of an epicyclic gear set, the entry sun wheel (34) of which, coaxial thereto, is rotated by the general machine drive, and the planet wheels (32, 33) of which are mutually coaxial, are mutually rigid and are idly mounted on the structure (4), an eccentric pin on the gear wheel (8) being connected to the slide (10) by a connecting rod (11).

4. A device as claimed in claim 3, characterized in that the engagement between the receptacles (18) and the respective shafts (14 and 15) is effected by an idle pin (150) perpendicular to these latter, which at one end comprises a crank (152) engaged in a positive-acting cam (153) which is fixed to the plate (3) and converts the translational movements of the slide (10) into rocking movements of the receptacles about the axis of the pin (150).

5. A device as claimed in claim 2, characterized in that the plate (3) carries, parallel to the guides (9) for the slide (10), an idle prismatic shaft (19), one end of which is connected to the end of the rocker arm (23) by a connecting rod-crank unit (21, 22), and on which supported by the slide (10) there slides, while remaining torsionally locked, a gear wheel (27) which transmits motion to the shafts (14 and 15).

6. A device as claimed in claim 5, characterised in that the gear wheel (27) engages a toothed sector (28) keyed on one of the shaft (14), from which there extends a crank (29) connected by a connecting rod (30) to an identical crank (31) fixed to the other shaft (15).

7. A device as claimed in claim 2, characterized in that the engagement between the receptacles (18) and the respective shafts (14 and 15) is effected by an idle pin (150) perpendicular to these latter, which at one end comprises a crank (152) engaged in a positive-acting cam (153) which is fixed to the plate (3) and converts the transitional movements of the slide (10) into rocking movements of the receptacles about the axis of the pin (150).

* * * * *